(12) United States Patent
Ishida et al.

(10) Patent No.: US 10,910,658 B2
(45) Date of Patent: Feb. 2, 2021

(54) FUEL CELL METAL SEPARATOR, METHOD OF PRODUCING THE FUEL CELL METAL SEPARATOR, AND POWER GENERATION CELL

(71) Applicant: HONDA MOTOR CO., LTD., Tokyo (JP)

(72) Inventors: Kentaro Ishida, Wako (JP); Yu Tomana, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 45 days.

(21) Appl. No.: 15/888,216

(22) Filed: Feb. 5, 2018

(65) Prior Publication Data

US 2018/0226663 A1    Aug. 9, 2018

(30) Foreign Application Priority Data

Feb. 8, 2017  (JP) ................................. 2017-021278

(51) Int. Cl.
*H01M 8/0273*    (2016.01)
*H01M 8/0276*    (2016.01)
(Continued)

(52) U.S. Cl.
CPC ....... *H01M 8/0276* (2013.01); *H01M 8/0206* (2013.01); *H01M 8/0254* (2013.01); *H01M 8/0258* (2013.01); *H01M 8/0273* (2013.01); *H01M 8/1004* (2013.01); *H01M 8/0267* (2013.01); *H01M 2008/1095* (2013.01); *Y02E 60/50* (2013.01); *Y02P 70/50* (2015.11)

(58) Field of Classification Search
CPC ............. H01M 8/0273; H01M 8/0276; H01M 8/0258; H01M 8/0254; H01M 8/1004; H01M 8/0206; H01M 2008/1095; H01M 8/0267; Y02P 70/56; Y02E 60/50
See application file for complete search history.

(56) References Cited

U.S. PATENT DOCUMENTS 6,605,380 B2    8/2003 Chen et al.
8,252,475 B2 *  8/2012 Kobuchi ............. H01M 8/0213
                                                  429/457
(Continued)

FOREIGN PATENT DOCUMENTS

JP    2004-055248    2/2004
JP    2006-073398    3/2006
(Continued)

OTHER PUBLICATIONS

Japanese Office Action for Japanese Patent Application No. 2017-021278 dated Jul. 17, 2018.

*Primary Examiner* — Milton I Cano
*Assistant Examiner* — Philip A. Stuckey
(74) *Attorney, Agent, or Firm* — Amin, Turocy & Watson LLP (57) ABSTRACT

A fluid passage for supplying or discharging fluid extends through a metal separator in a separator thickness direction, and a bead seal configured to prevent leakage of the fluid protrudes from the metal separator. A folded portion is formed in an outer marginal portion of the metal separator or in an inner marginal portion of the fluid passage, and the folded portion is bent or curved in a direction opposite to the protruding direction of the bead seal.

5 Claims, 5 Drawing Sheets

(51) Int. Cl.
*H01M 8/0258* (2016.01)
*H01M 8/0254* (2016.01)
*H01M 8/1004* (2016.01)
*H01M 8/0206* (2016.01)
H01M 8/0267 (2016.01)
H01M 8/1018 (2016.01)

(56) References Cited

U.S. PATENT DOCUMENTS

| | | | |
|---|---|---|---|
| 2004/0013931 A1 | 1/2004 | Takamura et al. | |
| 2005/0064267 A1* | 3/2005 | Gutternnann | H01M 8/0228 429/434 |
| 2007/0031719 A1* | 2/2007 | Ishioka | H01M 8/0206 429/483 |
| 2009/0117443 A1* | 5/2009 | Trabold | H01M 8/0228 429/514 |
| 2009/0197147 A1* | 8/2009 | Fly | H01M 8/0276 429/509 |
| 2011/0129756 A1* | 6/2011 | Erikstrup | H01M 8/241 429/457 |
| 2011/0195332 A1* | 8/2011 | Goebel | H01M 8/0232 429/465 |
| 2014/0147762 A1* | 5/2014 | Maass | H01M 8/0271 429/434 |
| 2015/0188152 A1* | 7/2015 | Mitsuta | H01M 8/0273 429/481 |

FOREIGN PATENT DOCUMENTS

| | | |
|---|---|---|
| JP | 2006-190626 | 7/2006 |
| JP | 2008-130433 | 6/2008 |
| JP | 2012-213797 | 11/2012 |

\* cited by examiner

FUEL CELL METAL SEPARATOR, METHOD OF PRODUCING THE FUEL CELL METAL SEPARATOR, AND POWER GENERATION CELL

CROSS-REFERENCE TO RELATED APPLICATION

This application is based upon and claims the benefit of priority from Japanese Patent Application No. 2017-021278 filed on Feb. 8, 2017, the contents of which are incorporated herein by reference.

BACKGROUND OF THE INVENTION

Field of the Invention

The present invention relates to a fuel cell metal separator, a method of producing the fuel cell metal separator, and a power generation cell.

Description of the Related Art

A fuel cell (power generation cell) includes a membrane electrode assembly (MEA) and separators (bipolar plates) sandwiching the membrane electrode assembly. An anode is provided on one surface of an electrolyte membrane and a cathode is provided on the other surface of the electrolyte membrane to form the membrane electrode assembly. The electrolyte membrane is a polymer ion exchange membrane. Such a fuel cell is known conventionally. Normally, a predetermined number of power generation cells are stacked together to form a fuel cell stack. For example, the fuel cell stack is mounted in a fuel cell vehicle (fuel cell electric vehicle, etc.) as an in-vehicle fuel cell stack.

In some cases, metal separators are used as separators. Fluid passages for supplying or discharging an oxygen-containing gas, a fuel gas, and a coolant as fluid extend through the metal separators in the thickness direction of the metal separators. Further, seal members are provided for the metal separators for preventing leakage of the fluid. Elastic rubber seals of fluorine based materials or silicone are used as the seal members. This pushes up the cost disadvantageously.

In this regard, for example, as disclosed in U.S. Pat. No. 6,605,380, instead of the elastic rubber seals, sealing beads (bead seals) are formed on the metal separators. The bead seals have a shape expanded from flat portions (base plates) of the metal separators. Since the bead seals are formed by press forming, the production cost is low advantageously.

Further, in recent years, in an attempt to reduce the quantity of the relatively expensive solid polymer electrolyte membrane, and protect the thin solid polymer electrolyte membrane having the low strength, a frame equipped MEA including a resin frame member in its outer periphery has been adopted (see, e.g., Japanese Laid-Open Patent Publication No. 2008-130433). In a power generation cell where the resin frame equipped MEA is sandwiched between metal separators having bead seals, the bead seals contact resin frame members.

SUMMARY OF THE INVENTION

In a metal separator having bead seals, folded portions are formed in the outer marginal portion of the metal separator and the inner marginal portions of the fluid passages, so as to avoid contact with the adjacent resin frame members. However, at the time of applying a predetermined tightening load to the power generation cell (when the metal separator is compressed), the folded portion as the trim end (the outer marginal portion or the inner marginal portion) floats, or the folded portion is displaced, toward the resin frame member, and the resin frame member may be damaged by a front end edge of the folded portion undesirably.

The present invention has been made taking the problem of the above type into consideration, and an object of the present invention is to provide a fuel cell metal separator, a method of producing the metal separator, and a power generation cell in which it is possible to prevent damage of a resin frame member by a front end edge of an outer marginal portion of a metal separator having a bead seal or an inner marginal portion of a fluid passage extending through the metal separator.

In order to achieve the above object, the present invention provides a fuel cell metal separator configured to be stacked on a resin frame equipped membrane electrode assembly to form a power generation cell. The resin frame equipped membrane electrode assembly includes a membrane electrode assembly and a resin frame member provided at an outer periphery of the membrane electrode assembly. A fluid passage configured to supply or discharge an oxygen-containing gas, a fuel gas, or a coolant as fluid extends through the fuel cell metal separator in a separator thickness direction, and a bead seal configured to prevent leakage of the fluid protrudes from the fuel cell metal separator in the separator thickness direction. A folded portion is formed in an outer marginal portion of the fuel cell metal separator or in an inner marginal portion of the fluid passage, and the folded portion is bent or curved in a direction opposite to a protruding direction of the bead seal.

Preferably, the folded portion includes an inclined part inclined in a direction opposite to the protruding direction, toward a front end edge.

Preferably, the folded portion is curved, and expanded in the protruding direction.

Further, the present invention provides a method of producing a fuel cell metal separator configured to be stacked on a resin frame equipped membrane electrode assembly to form a power generation cell. The resin frame equipped membrane electrode assembly includes a membrane electrode assembly and a resin frame member provided at an outer periphery of the membrane electrode assembly. A fluid passage configured to supply or discharge an oxygen-containing gas, a fuel gas, or a coolant as fluid extends through the fuel cell metal separator in a separator thickness direction, and a bead seal configured to prevent leakage of the fluid protrudes from the fuel cell metal separator in the separator thickness direction. The method includes the step of, at the time of trimming an outer marginal portion of the fuel cell metal separator or an inner marginal portion of the fluid passage, moving a trimming die from a side where the bead seal protrudes, in a direction opposite to a protruding direction of the bead seal.

Further, the present invention provides a power generation cell. The power generation cell includes a resin frame equipped membrane electrode assembly including a membrane electrode assembly and a resin frame member provided at an outer periphery of the membrane electrode assembly, and metal separators stacked on both sides of the resin frame equipped membrane electrode assembly, respectively. A fluid passage configured to supply or discharge an oxygen-containing gas, a fuel gas, or a coolant as fluid extends through the fuel cell metal separators in a separator thickness direction, and a bead seal configured to prevent leakage of the fluid protrudes from the fuel cell metal separators toward the resin frame member. A folded portion is formed in an outer marginal portion of each of the fuel cell metal separators or in an inner marginal portion of the fluid passage, and the folded portion is bent or curved in a direction opposite to the protruding direction of the bead seal.

The folded portion is formed in the outer marginal portion of the fuel cell metal separator or in the inner marginal portion of the fluid passage, and the folded portion is bent or curved in a direction opposite to the protruding direction of the bead seal. In the structure, when the fuel cell metal separator is compressed and the outer marginal portion or the inner marginal portion is displaced toward the resin frame member, it is possible to avoid the situation where the front end edge contacts the resin frame member. Therefore, it is possible to prevent the resin frame member from being damaged by the front end edge.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of a fuel cell metal separator, a method of producing the fuel cell metal separator, and a power generation cell according to the present invention will be described with reference to the accompanying drawings. In a second embodiment, the constituent elements that are identical or similar to those of a first embodiment are labeled with the same reference numerals, and detailed description is omitted.

Figure 1:
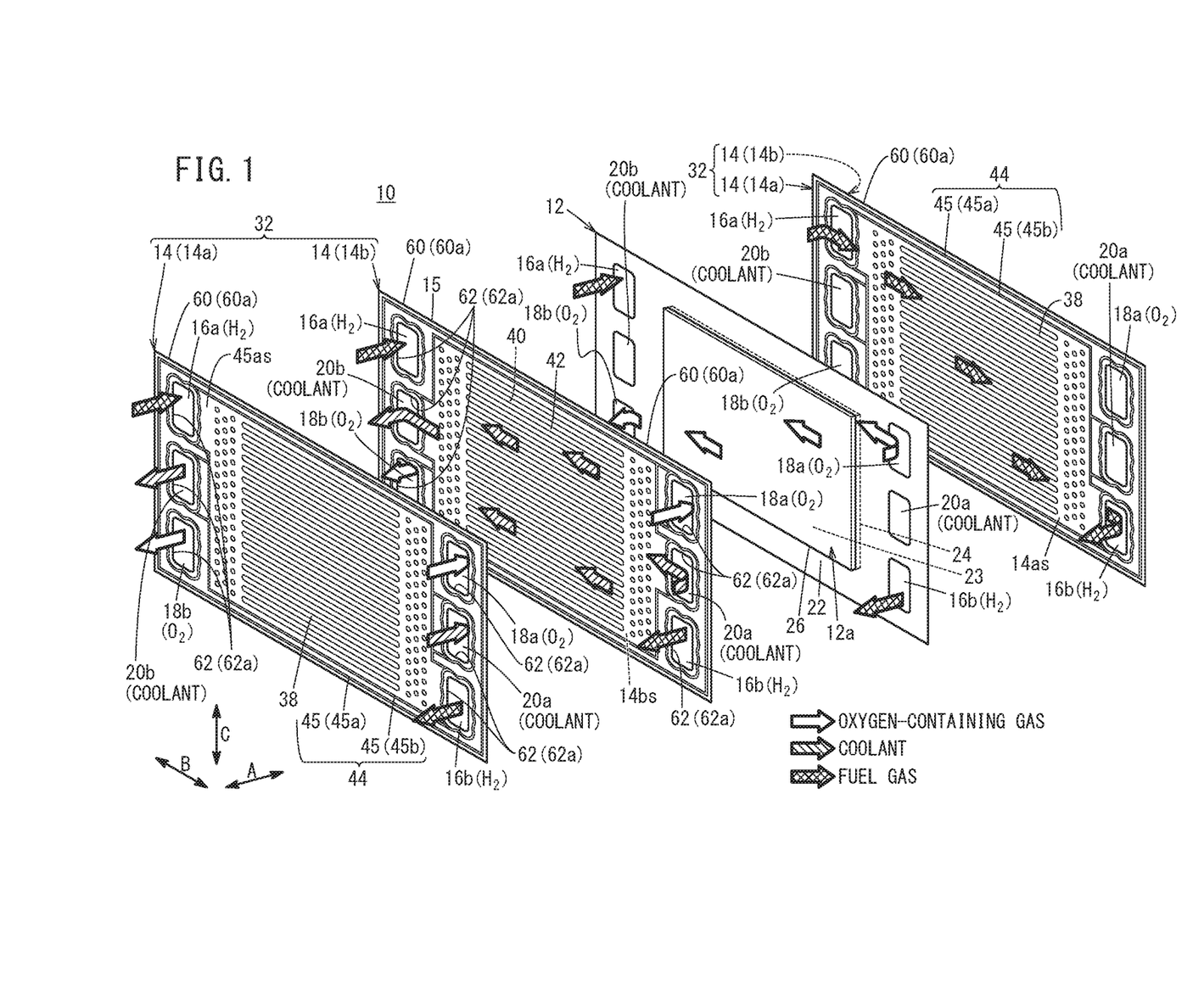
FIG. 1 is an exploded perspective view showing a power generation cell including a metal separator according to a first embodiment of the present invention.
Figure 2:
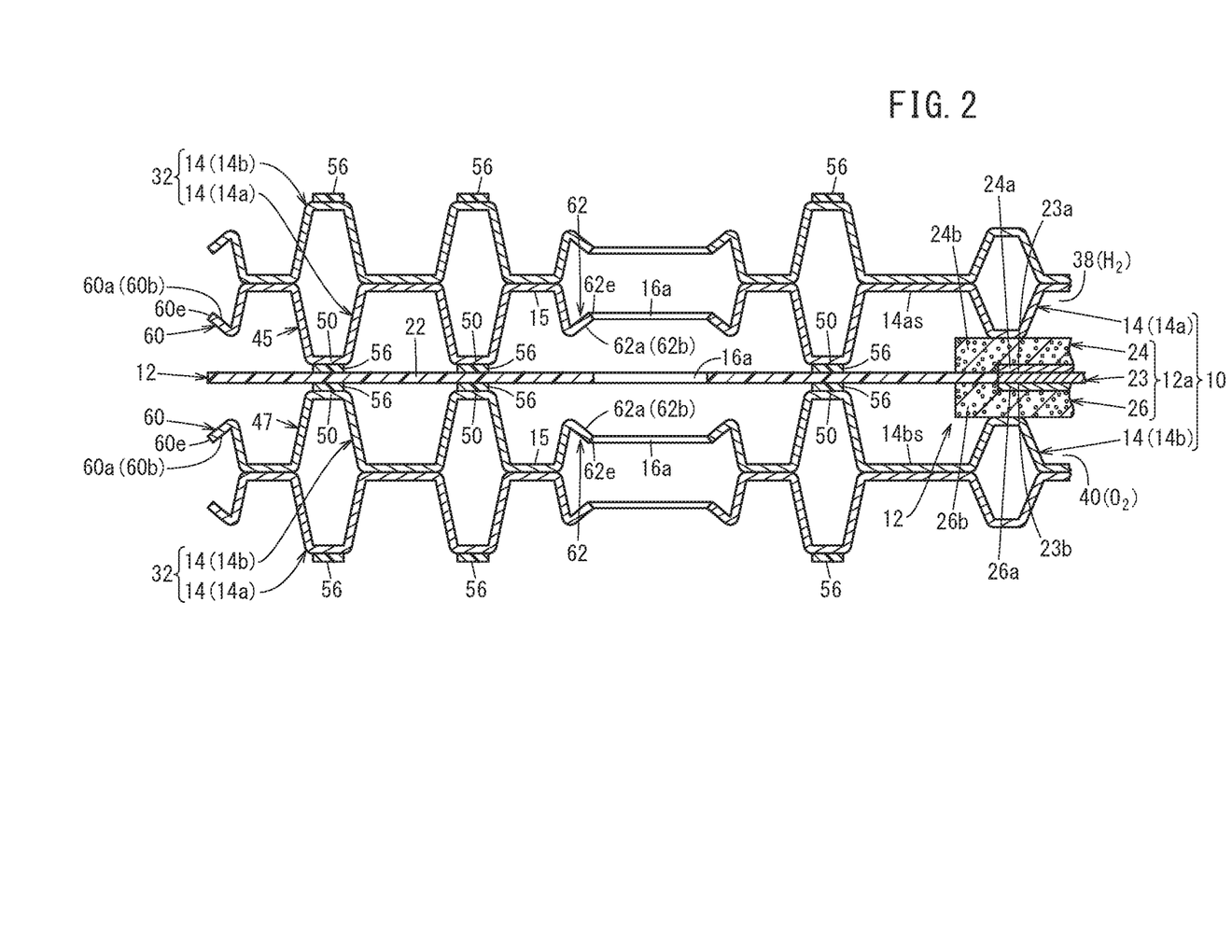
FIG. 2 is a cross sectional view showing the power generation cell shown in FIG. 1.

As shown in FIGS. 1 and 2, a power generation cell (fuel cell) 10 includes a frame equipped membrane electrode assembly (hereinafter referred to as the "resin frame equipped MEA 12"), and metal separators 14 according to the first embodiment provided on both sides of the resin frame equipped MEA 12, respectively. The power generation cell 10 is a laterally elongated (or longitudinally elongated) rectangular solid polymer electrolyte fuel cell.

A plurality of the power generation cells 10 are stacked together in a horizontal direction indicated by an arrow A or in a gravity direction (stacking direction) indicated by an arrow C, and a tightening load (compression load) is applied to the power generation cells 10 in the stacking direction to form a fuel cell stack. For example, the fuel cell stack is mounted as an in-vehicle fuel cell stack, in a fuel cell electric automobile (not shown).

As shown in FIG. 1, at one end of the power generation cell 10 in the horizontal direction indicated by the arrow B, an oxygen-containing gas supply passage 18a, a coolant supply passage 20a, and a fuel gas discharge passage 16b are provided. The oxygen-containing gas supply passage 18a, the coolant supply passage 20a, and the fuel gas discharge passage 16b extend through the power generation cell 10 in the stacking direction indicated by the arrow A. The oxygen-containing gas is supplied through the oxygen-containing gas supply passage 18a, and the coolant is supplied through the coolant supply passage 20a. A fuel gas such as a hydrogen-containing gas is discharged through the fuel gas discharge passage 16b. The oxygen-containing gas supply passage 18a, the coolant supply passage 20a, and the fuel gas discharge passage 16b are arranged in the vertical direction indicated by the arrow C.

At the other end of the power generation cell 10 in the direction indicated by the arrow B, a fuel gas supply passage 16a for supplying the fuel gas, a coolant discharge passage 20b for discharging the coolant, and an oxygen-containing gas discharge passage 18b for discharging the oxygen-containing gas are provided. The fuel gas supply passage 16a, the coolant discharge passage 20b, and the oxygen-containing gas discharge passage 18b extend through the power generation cell 10 in the direction indicated by the arrow A. The fuel gas supply passage 16a, the coolant discharge passage 20b, and the oxygen-containing gas discharge passage 18b are arranged in the direction indicated by the arrow C.

In the power generation cell 10, the resin frame equipped MEA 12 is sandwiched between the metal separators 14. Hereinafter, the metal separator 14 provided on one surface of the resin frame equipped MEA 12 will also be referred to as a "first metal separator 14a", and the metal separator 14 provided on another surface of the resin frame equipped MEA 12 will also be referred to as a "second metal separator 14b". Each of the first metal separator 14a and the second metal separator 14b has a laterally elongated (or longitudinally elongated) rectangular shape.

The resin frame equipped MEA 12 includes a membrane electrode assembly 12a (hereinafter referred to as the "MEA 12a"), and a resin frame member 22 joined to an outer peripheral portion of the MEA 12a, around the outer peripheral portion of the MEA 12a. The MEA 12a includes an electrolyte membrane 23, an anode 24 provided on one surface of the electrolyte membrane 23, and a cathode 26 provided on another surface of the electrolyte membrane 23.

For example, the electrolyte membrane 23 is a solid polymer electrolyte membrane (cation ion exchange membrane). The solid polymer electrolyte membrane is formed by impregnating a thin membrane of perfluorosulfonic acid with water, for example. The electrolyte membrane 23 is interposed between the anode 24 and the cathode 26. A fluorine based electrolyte may be used as the electrolyte membrane 23. Alternatively, an HC (hydrocarbon) based electrolyte may be used as the electrolyte membrane 23.

As shown in FIG. 2, the anode 24 includes a first electrode catalyst layer 24a joined to one surface 23a of the electrolyte membrane 23 and a first gas diffusion layer 24b stacked on the first electrode catalyst layer 24a. The cathode 26 includes a second electrode catalyst layer 26a joined to another surface 23b of the electrolyte membrane 23 and a second gas diffusion layer 26b stacked on the second electrode catalyst layer 26a.

The resin frame member 22 is a rectangular resin film (sub-gasket), and the inner peripheral portion of the resin frame member 22 is joined to the outer peripheral portion of the MEA 12*a*. In FIG. 1, at one end of the resin frame member 22 in the direction indicated by the arrow B, the oxygen-containing gas supply passage 18*a*, the coolant supply passage 20*a*, and the fuel gas discharge passage 16*b* are provided. At the other end of the resin frame member 22 in the direction indicated by the arrow B, the fuel gas supply passage 16*a*, the coolant discharge passage 20*b*, and the oxygen-containing gas discharge passage 18*b* are provided.

Examples of materials of the resin frame member 22 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether resin), PET (polyethylene terephthalate), PBT (polybutylene terephthalate), or modified polyolefin.

The metal separator 14 is formed by press forming of a metal thin plate to have a corrugated shape in cross section. For example, the metal plate is a steel plate, a stainless steel plate, an aluminum plate, a plate steel plate, or a metal plate having an anti-corrosive surface by surface treatment. Outer ends of the first metal separator 14*a* and the second metal separator 14*b* are joined together by welding, brazing, crimpling, etc. to form a joint separator 32.

The first metal separator 14*a* has a fuel gas flow field 38 on its surface 14*as* facing the resin frame equipped MEA 12. The fuel gas flow field 38 is connected to the fuel gas supply passage 16*a* and the fuel gas discharge passage 16*b*. Specifically, the fuel gas flow field 38 is formed between the first metal separator 14*a* and the resin frame equipped MEA 12. The fuel gas flow field 38 includes a plurality of straight flow grooves (or wavy flow grooves) extending in the direction indicated by the arrow B.

Figure 3:
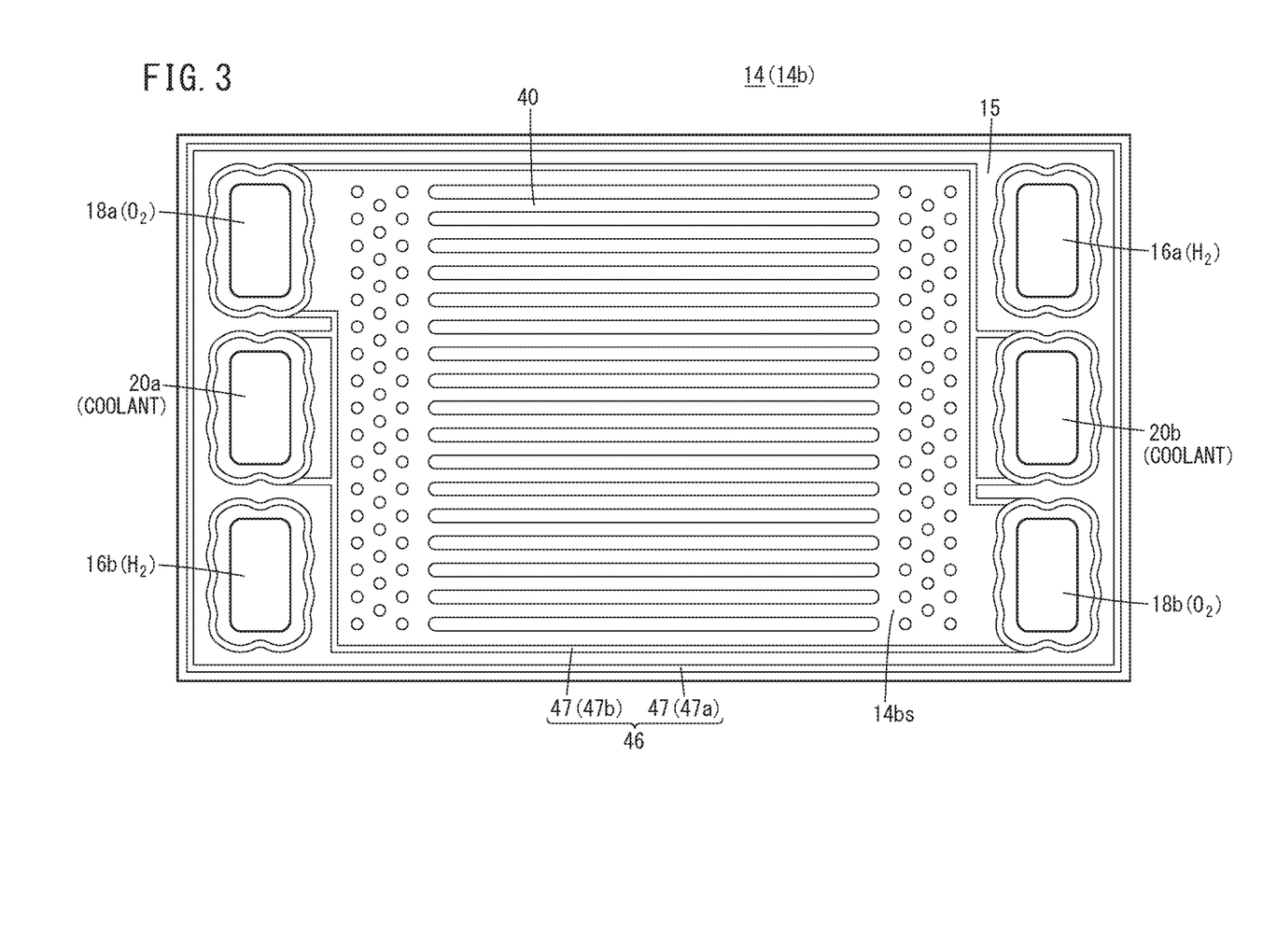
FIG. 3 is a plan view showing a second metal separator.

As shown in FIG. 3, the second metal separator 14*b* has an oxygen-containing gas flow field 40 on its surface 14*bs* facing the resin frame equipped MEA 12. The oxygen-containing gas flow field 40 is connected to the oxygen-containing gas supply passage 18*a* and the oxygen-containing gas discharge passage 18*b*. Specifically, the oxygen-containing gas flow field 40 is formed between the second metal separator 14*b* and the resin frame equipped MEA 12. The oxygen-containing gas flow field 40 includes a plurality of straight flow grooves (or wavy flow grooves) extending in the direction indicated by the arrow B.

In FIG. 1, a coolant flow field 42 is formed between the first metal separator 14*a* and the second metal separator 14*b* which are adjacent to each other. The coolant flow field 42 is connected to the coolant supply passage 20*a* and the coolant discharge passage 20*b*. The coolant flow field 42 extends in the direction indicated by the arrow B.

A first seal line 44 for preventing leakage of fluid (fuel gas, oxygen-containing gas, or coolant) is formed with the first metal separator 14*a*, on the surface 14*as* of the first metal separator 14*a* facing the MEA 12*a*. The first seal line 44 is provided around the outer periphery of the first metal separator 14*a*. The first seal line 44 is expanded (protrudes) toward the resin frame member 22, and contacts the resin frame member 22 in an air-tight and liquid tight manner.

The first seal line 44 comprises a plurality of bead seals 45 (metal bead seals). The plurality of bead seals 45 include an outer bead seal 45*a* and an inner bead seal 45*b* provided inside the outer bead seal 45*a*. The inner bead seal 45*b* is formed around the fuel gas flow field 38, the fuel gas supply passage 16*a*, and the fuel gas discharge passage 16*b*, while allowing the fuel gas flow field 38 to be connected to the fuel gas supply passage 16*a* and the fuel gas discharge passage 16*b*.

As shown in FIG. 3, a second seal line 46 for preventing leakage of fluid is formed with the second metal separator 14*b*, on the surface 14*bs* of the second metal separator 14*b* facing the MEA 12*a*. The second seal line 46 is provided around the outer periphery of the second metal separator 14*b*. The second seal line 46 is expanded (protrudes) toward the resin frame member 22, and contacts the resin frame member 22 in an air-tight and liquid tight manner. The first seal line 44 and the second seal line 46 face each other through the resin frame member 22. The resin frame member 22 is sandwiched between the first seal line 44 and the second seal line 46.

The second seal line 46 comprises a plurality of bead seals 47 (metal bead seals). The plurality of bead seals 47 includes an outer bead seal 47*a* and an inner bead seal 47*b* provided inside the outer bead seal 47*a*. The inner bead seal 47*b* is formed around the oxygen-containing gas flow field 40, the oxygen-containing gas supply passage 18*a*, and the oxygen-containing gas discharge passage 18*b*, while allowing the oxygen-containing gas flow field 40 to be connected to the oxygen-containing gas supply passage 18*a* and the oxygen-containing gas discharge passage 18*b*.

As shown in FIG. 2, the bead seals 45, 47 protrude from a base plate 15 of the metal separator 14 in the stacking direction of the power generation cells 10 (in the stacking direction of the MEA 12*a* and the metal separator 14) (thickness direction of the separator). Each of the bead seals 45, 47 is tapered (narrowed) in cross section toward its front end (toward the resin frame member 22).

In FIG. 2, a resin seal member 56 (micro seal) is fixed to a top 50 of each of the bead seals 45, 47 by printing or coating. Therefore, the top 50 of the bead seal 45 contacts the resin frame member 22 through the resin seal member 56. For example, the resin seal member 56 is made of polyester fiber. It should be noted that the resin seal member 56 may be omitted, and the top 50 may directly contact the resin frame member 22.

A folded portion 60*a* is provided in an outer marginal portion 60 of each of the metal separators 14. The folded portion 60*a* is bent in a direction opposite to the protruding direction of the bead seals 45, 47 (in a direction opposite to the side where the resin frame member 22 adjacent to the bead seals 45, 47 is present). The folded portion 60*a* is provided over the entire periphery of the outer marginal portion 60. The height of the folded portion 60*a* from the base plate 15 of the metal separator 14 is lower than the protruding height of the bead seals 45, 47 from the base plate 15. The folded portion 60*a* is spaced from the resin frame member 22.

The folded portion 60*a* is inclined from the resin frame member 22 (surface perpendicular to the stacking direction of the metal separator 14 and the resin frame equipped MEA). Specifically, the folded portion 60*a* includes an inclined part 60*b* inclined in a direction opposite to the protruding direction of the bead seals 45, 47 (in a direction away from the resin frame member 22), toward a front end edge 60*e*. Therefore, the folded portion 60*a* protrudes in a direction away from the adjacent resin frame member 22.

In each of the metal separators 14, the folded portion 62*a* is provided in an inner marginal portion 62 of the fuel gas supply passage 16*a*. A folded portion 62*a* is bent in a direction opposite to the protruding direction of the bead seals 45, 47. The folded portion 62*a* is provided over the entire periphery of the inner marginal portion 62. The height of the folded portion 62*a* from the base plate 15 of the metal separator 14 is lower than the protruding height of the bead seals 45, 47 from the base plate 15. The folded portion 62a is spaced from the resin frame member 22.

The folded portion 62a is inclined from the resin frame member 22. Specifically, the folded portion 62a includes an inclined part 62b inclined in a direction opposite to the protruding direction of the bead seals 45, 47 (in a direction away from the resin frame member 22), toward a front end edge 62e. Therefore, the folded portion 62a protrudes in a direction away from the adjacent resin frame member 22.

Though not shown in detail, likewise, the folded portion 62a is provided at each of the inner marginal portions 62 of the fuel gas discharge passage 16b, the oxygen-containing gas supply passage 18a, the oxygen-containing gas discharge passage 18b, the coolant supply passage 20a, and the coolant discharge passage 20b of the metal separator 14 shown in FIG. 1. The folded portion 62a is bent in a direction opposite to the protruding direction of the bead seals 45, 47.

Next, a method of producing the metal separator 14 having the above structure will be described.

The metal separator 14 is formed by press forming of a metal panel as a base material. By the press forming, fluid flow fields (flue gas flow field 38, oxygen-containing gas flow field 40, coolant flow field 42), and the bead seals 45, 47 are formed. The outer marginal portions 60 of the metal separator 14 and the inner marginal portions 62 of the fluid passages (fuel gas supply passage 16a, fuel gas discharge passage 16b, oxygen-containing gas supply passage 18a, oxygen-containing gas discharge passage 18b, coolant supply passage 20a, and coolant discharge passage 20b) are formed by trimming.

Figure 4:
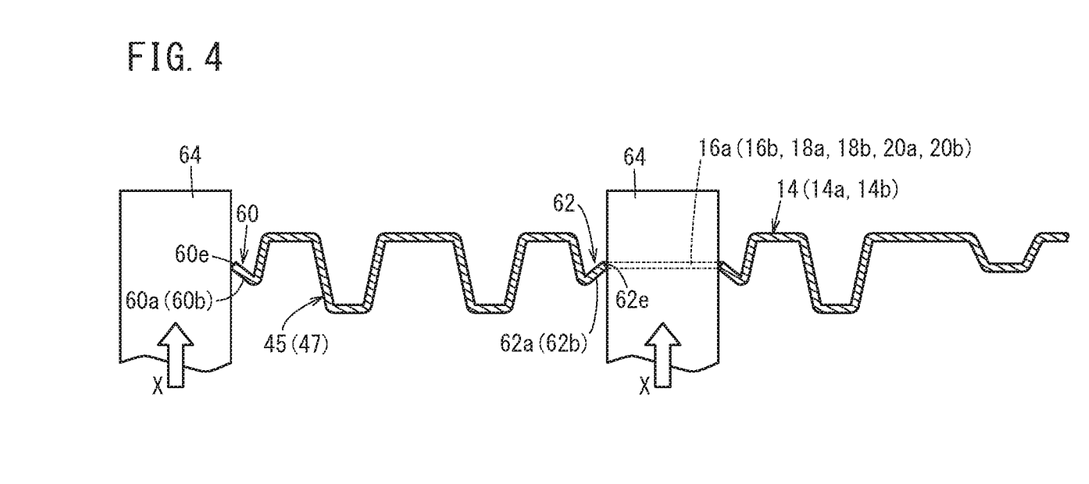
FIG. 4 is a view showing a method of producing a metal separator.

Specifically, as shown in FIG. 4, at the time of trimming the outer marginal portions 60 and the inner marginal portions 62, a trimming die 64 is moved (inserted) in a direction (indicated by an arrow X) opposite to the protruding direction of the bead seals 45, 47 from a side where the bead seals 45, 47 protrude. In this manner, the folded portions 60a, 62a which are bent in the direction opposite to the protruding direction of the bead seals 45, 47 (folded portions 60a, 62a having the inclined parts 60b, 62b) are formed. In this case, the shapes of burrs formed in the outer marginal portion 60 and the inner marginal portions 62 as a result of trimming may be included in the concept of the folded portions 60a, 62a (inclined parts 60b, 62b). The trimming die 64 may have a shaping portion (forming portion) corresponding to the folded portions 60a, 62a so as to form the bent folded portions 60a, 62a.

Operation of the power generation cell 10 having the above structure will be described below.

As shown in FIG. 1, an oxygen-containing gas is supplied to the oxygen-containing gas supply passage 18a, and a fuel gas such as a hydrogen gas is supplied to the fuel gas supply passage 16a. Further, a coolant such as pure water, ethylene glycol, or oil is supplied to the coolant supply passage 20a.

Therefore, the oxygen-containing gas flows from the oxygen-containing gas supply passage 18a to the oxygen-containing gas flow field 40 of the second metal separator 14b, and moves in the direction indicated by the arrow B, and the oxygen-containing gas is supplied to the cathode 26 of the MEA 12a. In the meanwhile, the fuel gas flows from the fuel gas supply passage 16a into the fuel gas flow field 38 of the first metal separator 14a. The fuel gas moves along the fuel gas flow field 38 in the direction indicated by the arrow B, and the fuel gas is supplied to the anode 24 of the MEA 12a.

Therefore, in the MEA 12a, the oxygen-containing gas supplied to the cathode 26 and the fuel gas supplied to the anode 24 are partially consumed in the second electrode catalyst layer 26a and the first electrode catalyst layer 24a by electrochemical reactions to generate electrical energy.

Then, in FIG. 1, the oxygen-containing gas supplied to, and partially consumed at the cathode 26 is discharged in the direction indicated by the arrow A along the oxygen-containing gas discharge passage 18b. Likewise, the fuel gas supplied to, and partially consumed at the anode 24 is discharged in the direction indicated by the arrow A along the fuel gas discharge passage 16b.

Further, the coolant supplied to the coolant supply passage 20a flows into the coolant flow field 42 between the first metal separator 14a and the second metal separator 14b, and then, the coolant flows in the direction indicated by the arrow B. After the coolant cools the MEA 12a, the coolant is discharged through the coolant discharge passage 20b.

In this case, the power generation cell 10 having the metal separator 14 according to the first embodiment offers the following effects and advantages.

As shown in FIG. 2, in the power generation cell 10 including the metal separator 14, the folded portions 60a, 62a are formed in the outer marginal portion 60 of the metal separator 14 and the inner marginal portions 62 of the fluid passages, and the folded portions 60a, 62a are bent in the direction opposite to the protruding direction of the bead seals 45, 47. Alternatively, only the folded portion 60a may be formed, or only the folded portions 62a may be formed. Thus, when the metal separator 14 is compressed (when the tightening load is applied to the power generation cell 10), it is possible to avoid the situation where the front end edges 60e, 62e contact the resin frame member 22, when the bead seals 45, 47 are deformed elastically and the outer marginal portion 60 or the inner marginal portions 62 is displaced toward the resin frame member 22. Further, it is possible to prevent the resin frame member 22 from being damaged by the front end edges 60e, 62e.

The folded portions 60a, 62a include inclined parts 60b, 62b which are inclined in a direction opposite to the protruding direction of the bead seals 45, 47, toward the front end edges 60e, 62e. In the structure, it is possible to prevent the resin frame member 22 from being damaged by the front end edges 60e, 62e when the separator is compressed, effectively to a greater extent.

As shown in FIG. 4, the folded portions 60a, 62a having the inclined parts 60b, 62b can be formed easily by moving the trimming die 64 in a direction opposite to the protruding direction of the bead seals 45, 47 from the side where the bead seals 45, 47 protrude. In this case, since it is possible to form the folded portions 60a, 62a without requiring the trimming die 64 to have the shapes corresponding to the folded portions 60a, 62a, the trimming die 64 does not need to have a special shape. With the simple and economical method, it is possible to prevent the resin frame member 22 from being damaged by the front end edges 60e, 62e.

Figure 5:
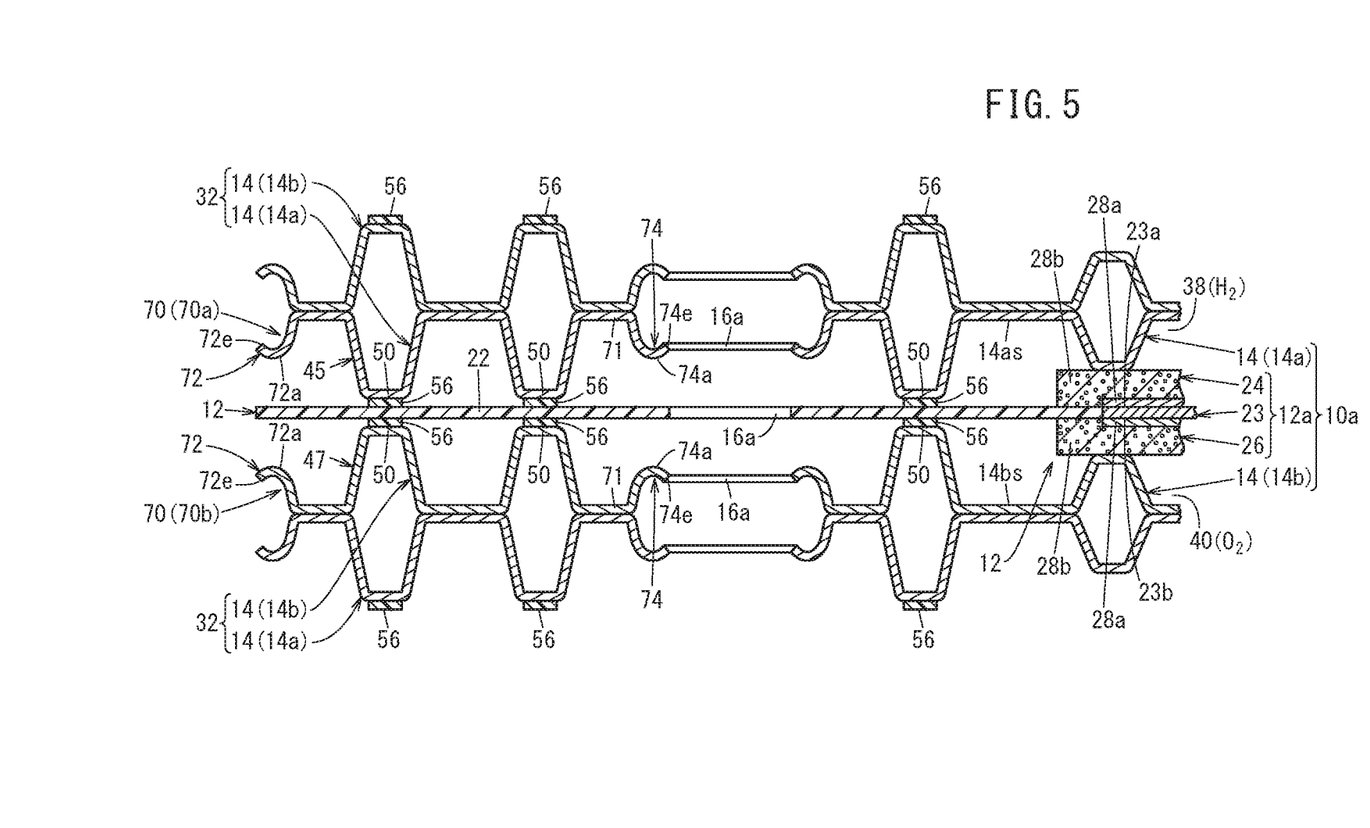
FIG. 5 is a cross sectional view showing a power generation cell including a metal separator according to a second embodiment of the present invention.

As shown in FIG. 5, in a power generation cell 10a having metal separators 70 (first metal separator 70a and second metal separator 70b) according to the second embodiment of the present invention, a folded portion 72a is provided in an outer marginal portion 72 of each of the metal separators 70. The folded portion 72a is curved in a direction opposite to the protruding direction of the bead seals 45, 47 (in a direction opposite to the resin frame member 22 adjacent to the bead seals 45, 47).

The folded portion 72a is provided over the entire periphery of the outer marginal portion 72. The height of the folded portion 72a from a base plate 71 of the metal separator 70 is smaller than the protruding height of the bead seals 45, 47 from the base plate 71. The folded portion 72*a* is spaced from the resin frame member 22.

The folded portion 72*a* provided in the outer marginal portion 72 is curved in an arc shape, and the folded portion 72*a* is expanded in the protruding direction of the bead seals 45, 47. A front end edge 72*e* of the folded portion 72*a* is positioned closer to the base plate 71 of the metal separator 70 in comparison with the position of the folded portion 72*a* closest to the resin frame member 22 and spaced from the base plate 71.

In each of the metal separators 70, a folded portion 74*a* is provided in an inner marginal portion 74 of the fuel gas supply passage 16*a*. The folded portion 74*a* is bent in a direction opposite to the protruding direction of the bead seals 45, 47. The folded portion 74*a* is provided over the entire periphery of the inner marginal portion 74. The height of the folded portion 74*a* from the base plate 71 of the metal separator 70 is smaller than the protruding height of the bead seals 45, 47 from the base plate 71. The folded portion 74*a* is spaced from the resin frame member 22.

The folded portion 74*a* provided in the inner marginal portion 74 is curved in an arc shape to expand toward the protruding direction of the bead seals 45, 47. A front end edge 74*e* of the folded portion 74*a* is positioned closer to the base plate 71 of the metal separator 70 in comparison with the position of the folded portion 74*a* closest to the resin frame member 22 and spaced from the base plate 71.

Though not shown, as in the case of the metal separator 14 shown in FIG. 1, the fuel gas discharge passage 16*b*, the oxygen-containing gas supply passage 18*a*, the oxygen-containing gas discharge passage 18*b*, the coolant supply passage 20*a*, and the coolant discharge passage 20*b* are also provided in the metal separator 70. Further, the folded portion 74*a* is provided in each of inner marginal portions 74 of these fluid passages, and the folded portion 74*a* is bent in a direction opposite to the protruding direction of the bead seals 45, 47.

The metal separator 70 is formed by press forming of a metal panel as a base material. By the press forming, fluid flow fields (flue gas flow field 38, oxygen-containing gas flow field 40, coolant flow field 42), and bead seals 45, 47 are formed. The outer marginal portions 72 of the metal separator 70 and the inner marginal portions 74 of the fluid passages (fuel gas supply passage 16*a*, fuel gas discharge passage 16*b*, oxygen-containing gas supply passage 18*a*, oxygen-containing gas discharge passage 18*b*, coolant supply passage 20*a*, and coolant discharge passage 20*b*) are formed by trimming. In this case, the trimming die has a shaping portion (forming portion) corresponding to the folded portions 72*a*, 74*a* so as to form the curved folded portions 72*a*, 74*a*.

As described above, in the power generation cell 10*a* having the metal separator 70 according to the second embodiment, the folded portions 72*a*, 74*a* are formed in the outer marginal portion 72 of the metal separator 70 and the inner marginal portions 74 of the fluid passages (fuel gas supply passages 16*a*, etc.). Alternatively, only the folded portion 72*a* may be formed, or only the folded portions 74*a* may be formed. The folded portions 72*a*, 74*a* are curved in the direction opposite to the protruding direction of the bead seals 45, 47. Thus, when the metal separator 70 is compressed (when the tightening load is applied to the power generation cell 10*a*), it is possible to avoid the situation where the front end edges 72*e*, 74*e* contact the resin frame member 22, when the bead seals 45, 47 are deformed elastically and the outer marginal portion 72 or the inner marginal portions 74 are displaced toward the resin frame member 22. Thus, it is possible to prevent the resin frame member 22 from being damaged by the front end edges 72*e*, 74*e*.

The present invention is not limited to the above embodiments. Various modifications can be made without departing from the gist of the present invention.

What is claimed is:

1. A power generation cell, comprising:
a resin frame equipped membrane electrode assembly including a membrane electrode assembly and a resin frame member provided at an outer periphery of the membrane electrode assembly;
a first metal separator positioned adjacent to the resin frame equipped membrane electrode assembly, and
a second metal separator positioned adjacent to the resin frame equipped membrane electrode assembly and opposite the first metal separator,
the first metal separator comprising:
a fluid passage hole configured to supply or discharge an oxygen-containing gas, a fuel gas, or a coolant as fluid extending through the first metal separator;
a first bead seal having a first top wall and first side walls configured to prevent leakage of the fluid, the first bead seal protruding toward the resin frame member from a first base portion of the first metal separator;
a first folded portion formed in an outer marginal portion at a periphery of the first metal separator or in an inner marginal portion at a periphery of the fluid passage hole, the first folded portion protruding toward the resin frame member from the first base portion to a first bend, the first folded portion extending from the first bend to a first end edge, a first gap between the first bend and the resin frame member being smaller than a second gap between the first base portion and the resin frame member, a third gap between the first end edge and the resin frame member is greater than the first gap, and a height of the first bend from the first base portion of the first metal separator is smaller than a protruding height of the first bead seal from the first base portion,
the second metal separator comprising:
the fluid passage hole extending through the second metal separator;
a second bead seal having a second top wall and second side walls configured to prevent leakage of the fluid, the second bead seal protruding toward the resin frame member from a second base portion of the second metal separator;
a second folded portion formed in another outer marginal portion at a periphery of the second metal separator or in another inner marginal portion at a periphery of the fluid passage hole, the second folded portion protruding toward the resin frame member from the second base portion to a second bend, the second folded portion extending from the second bend to a second end edge, a fourth gap between the second bend and the resin frame member being smaller than a fifth gap between the second base portion and the resin frame member, a sixth gap between the second end edge and the resin frame member is greater than the fourth gap, and a height of the second bend from the second base portion of the second metal separator is smaller than a protruding height of the second bead seal from the second base portion, wherein the first folded portion and the second folded portion are spaced from the resin frame member.

2. The power generation cell according to claim 1, wherein the first folded portion includes a first inclined portion from the first bend to the first end edge at an incline with respect to the resin frame member, and
the second folded portion includes a second inclined portion from the second bend to the second end edge at an incline with respect to the resin frame member.

3. The power generation cell according to claim 1, wherein the first bend and the second bend are curved and expanded toward the resin frame member.

4. The power generation cell according to claim 1, wherein the first folded portion is provided at an entire periphery of the outer marginal portion or the inner marginal portion, and
the second folded portion is provided at an entire periphery of the other outer marginal portion of the other inner marginal portion.

5. The power generation cell according to claim 1, wherein
the first folded portion includes a portion having a shape of burrs generated by trimming the outer marginal portion or the inner marginal portion, and
the second folded portion includes a portion having a shape of burrs generated by trimming the other outer marginal portion or the other inner marginal portion.

\* \* \* \* \*